June 4, 1963

H. E. McKELVEY 3,092,482

MOLDS FOR BENDING GLASS SHEETS

Original Filed Jan. 4, 1956

*INVENTOR.*
HAROLD E. McKELVEY

BY Oscar H. Spencer

ATTORNEY

INVENTOR.
HAROLD E. McKELVEY
BY
Oscar L. Spencer
ATTORNEY

United States Patent Office 3,092,482
Patented June 4, 1963

---

3,092,482
MOLDS FOR BENDING GLASS SHEETS
Harold E. McKelvey, Rural Valley, Pa., assignor to Pittsburgh Plate Glass Company, Allegheny County, Pa., a corporation of Pennsylvania
Original application Jan. 4, 1956, Ser. No. 557,361, now Patent No. 3,000,143, dated Sept. 19, 1961. Divided and this application Oct. 12, 1960, Ser. No. 70,093
4 Claims. (Cl. 65—291)

This application relates to molds for bending glass sheets, particularly sheets which are to be bent to complex curvatures having a relatively gently curved central portion merging into regions of severe curvatures and terminating in relatively flat extremities which are bent substantially perpendicularly to the central portion of the sheet.

Conventionally, flat glass sheets are bent into curved shapes by mounting them on sectionalized molds comprising molding members which are spread open to receive the glass and are capable of moving into a closed mold position to form a substantially continuous frame conforming in elevation and outline to the curvature desired for the bent glass sheet. The glass laden molds are conveyed through a tunnel-like lehr where the glass and the mold are heated uniformly to glass softening temperatures. At these temperatures, the glass softens and the mold moves into its closed position. The bent glass sheet is then annealed or tempered depending upon its further use.

When bending glass to the complex curvatures described above, considerable difficulty is encountered in maintaining the sheet extremities relatively flat while curving the portions immediately longitudinally inwardly of these flat extremities to the severe curvatures required. The present invention provides apparatus which facilitate the obtention of such complex curvatures.

According to the present invention, novel mold structure is provided by sectionalizing the movable end members of a sectionalized mold in a novel manner. The mold elements include a central section comprising a pair of spaced rails of relatively gentle contour conforming in elevation and outline to the curvature desired for the central portion of a glass sheet to be supported on the mold. Planking each longitudinal extremity of the central molding member is a split molding member. Each split member includes a longitudinally inner section containing severely curved rails conforming in elevation and outline to the severely curved portion to which the glass sheet is to be bent, and a freely rotatable, relatively flat end section of substantially C-shaped contour. The latter section is pivotally mounted about an axis extending transversely of the mold longitudinally inwardly of the center of gravity of the end section so that the latter is free to rotate outwardly relative to the longitudinally inner section adjacent thereto within limits determined by stop members.

Each freely rotatable end section supports an extremity of the flat glass sheet mounted for bending on the extended mold. The longitudinal extremities of the rails of the center section provide spaced, intermediate support points for the flat glass. The inner sections of the split members are counterweighted to lift the split mold members and rotate the latter including their inner sections and their end sections in unison when glass sheets mounted for bending on the mold have heated sufficiently to allow softening to take place.

Means are attached to each extremity section to urge the latter to rotate into a closed position after the inner sections have substantially completed their movement into their closed positions. Such a structure enables the glass to be bent by first applying an upward thrust to each intermediate region and its adjacent extremity of the glass about a first axis of rotation and subsequently applying additional upward thrusts to the extremities only about a second axis of rotation disposed longitudinally outwardly of the first axis. By limiting the rotation of the extremities of the glass sheets to the final stages of the bending cycle, overbending of the tips or extremities of the glass sheet is minimized.

A primary object of the present invention is to provide apparatus for bending flat glass sheets into complex curvatures wherein overbending of the glass extremities is prevented.

Another object of the present invention is to provide apparatus for bending glass sheets to complex curvatures having a relatively gently curved central portion merging into regions of severe curvatures and terminating in relatively flat extremities which are bent substantially perpendicularly to the central portion of the sheet.

These and other objects of the present invention will become obvious upon studying a particular embodiment of this invention which is described for purposes of illustration rather than limitation. Various modifications not disclosed in the illustration will become obvious upon reading this description. These are included in the claims which accompany this application.

In the drawings forming part of the present invention,

Figure 1:
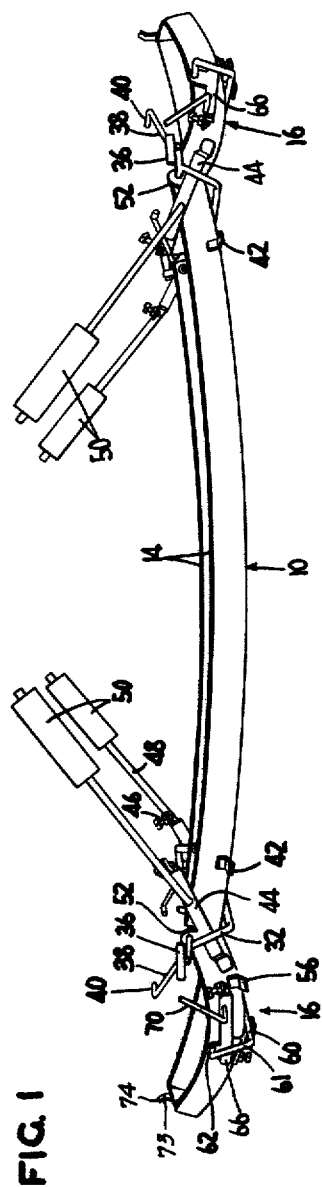
FIGURE 1 represents an elevational view of a bending mold according to the present invention shown in the open position for reciving a flat sheet of glass.
Figure 2:
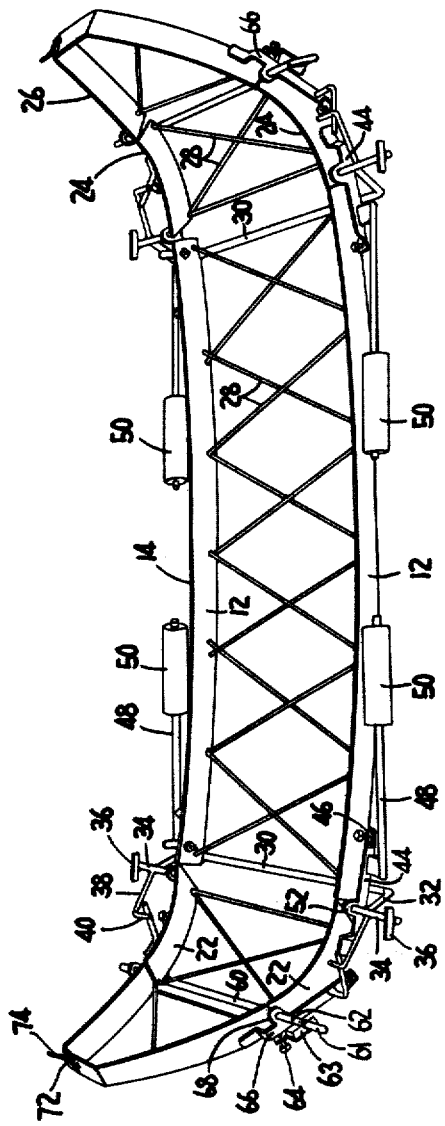
FIGURE 2 represents a perspective view of the mold closed upon completion of the bending cycle.
Figure 3:
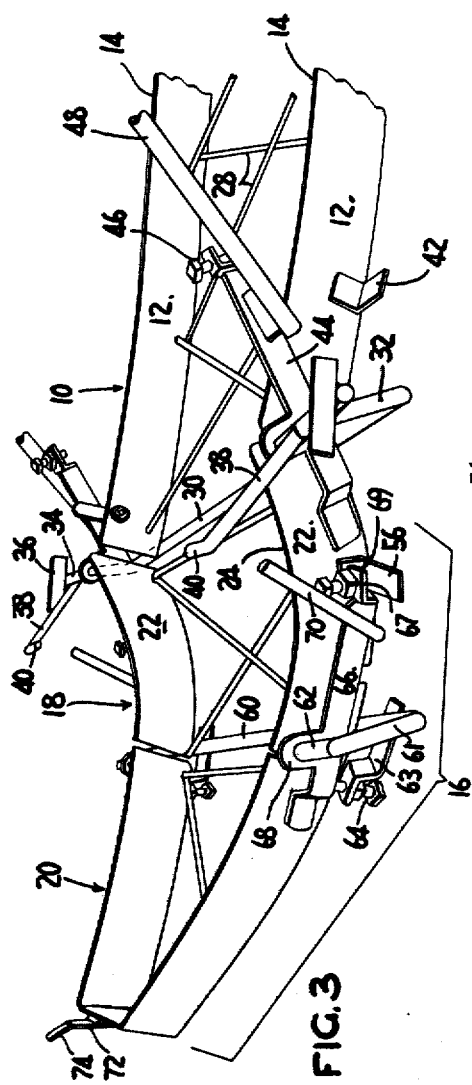
FIGURE 3 shows an enlarged perspective view of a portion of a bending mold opened to receive flat glass sheets.
Figure 4:
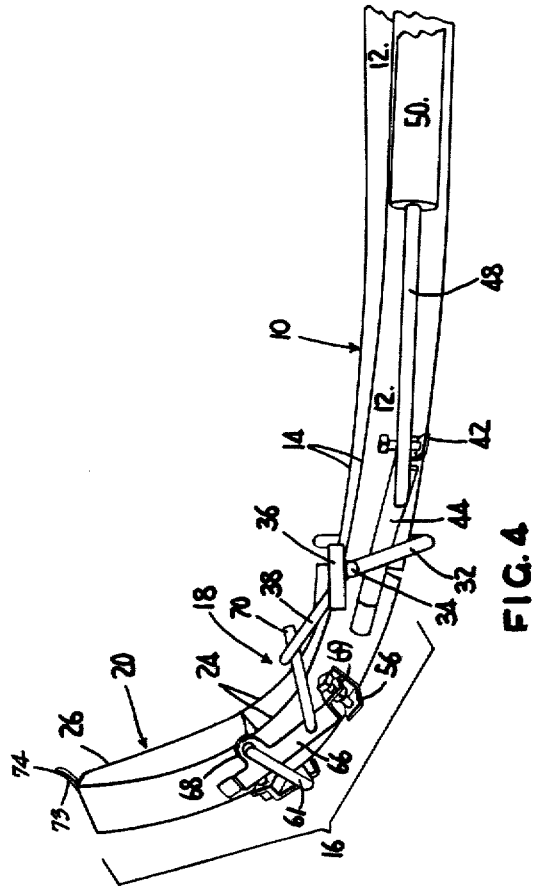
FIGURE 4 is an elevation showing the portion of the bending mold seen in FIGURE 3 in its closed position.

A typical apparatus includes a central molding member 10 comprising spaced rails 12 having upper shaping surfaces 14 of gently curved contour corresponding to the gently curved contour desired for the margins of the central portions of the bent glass sheet. The bending apparatus also includes sectionalized molding members 16 which are rotatable relative to the center molding member 10. These sectionalized molding members include longitudinally inner or intermediate sections 18 and longitudinally outer or extremity sections 20 (FIGURES 3 and 4).

The intermediate sections 18 each comprise intermediate rails 22 having extremely curved upper shaping surfaces 24. The extremity sections 20 are of substantially C-shaped configuration and comprise upper shaping surfaces 26. All the mold members are reinforced by suitable criss cross bracing members 28.

The center molding member 10 includes a pair of cross bars 30 interconnecting the longitudinal extremities of opposite rails 12. These cross bars extend laterally beyond the mold rails to form upturned ends 32 which are welded to support bars 34. Adjacent the lateral outboard extremity of each support bar 34 is a flange guide 36. These flange guides are helpful to guide mounting the molds on mold support carriages which are used to convey the molds through the tunnel-like bending lehr mentioned above.

Also welded to the support bars 34 are outwardly and upwardly extending fingers 38. These fingers terminate in turned ends 40. The purpose of these turned ends will be described in greater detail subsequently.

An inwardly extending strap 44 is connected to the outside of each of the intermediate rails 22. They are flanged and apertured adjacent their inner extremities to receive adjustable stop nuts 46. Counterweight arms 48 provided with counterweights or weight means 50 adjacent their inner extremities are welded to the straps 44. The straps also comprise an apertured ear 52 which forms a bearing connection about support bar 34. The intermediate section is provided with a stop flange 56 for purposes to be described later.

Each intermediate section 18 is provided with a cross bar 60 which terminates in an upturned portion 61 and a reentrant stub bearing rod 62. Z-shaped strips 63 extend outboard of the extremities of the cross bars 60 to which they are fixed. The strips are apertured at their outer extremities to receive adjustable stop nuts 64.

Each side of each extremity section 20 is provided with a strap 66 that extends longitudinally inwardly of its point of connection with the extremity section. The straps are provided with apertured ears 68 which receive the stub hinge rods 62, thereby enabling the extremity sections 20 to rotate relative to the intermediate sections 18. An adjustable stop nut 67 is mounted through an apertured offset flange 69 carried at the longitudinally inner extremity of each strap 66. A finger 70 extends inwardly and upwardly from strap 66.

At the longitudinally outer extremity of each section 20 there is a guide 72 for the glass extremity. The guide comprises a finger 73 rigidly secured to the outer surface of the mold extremity and extending upwardly therefrom along a slightly outwardly and upwardly directed axis. The finger is bent at its upper portion to form an oblique extension 74 to provide a guiding surface to insure proper loading. The oblique extension minimizes the danger of glass fracture at its extremities by providing a bearing surface along which the glass may be slid for loading in the event it is misaligned slightly relative to the open mold during loading.

The operation of the mold in bending glass to complex curvatures will now be described in order to explain how the present invention improves the production of complex curvatures.

The mold 10 is first loaded onto a mold support carriage. Then, the sectionalized molding members 16 are rotated about a first axis defined by support bars 34 into a spread position to receive the flat glass. In this position, the extremity sections 20 are also rotated relative to the intermediate sections 18 about a second axis defined by stub hinge rods 62 an amount limited by abutment of the strap 66 against the upper surface of the adjustable stop nuts 64.

After the glass is loaded on the mold at a loading station at the entrance of a tunnel-like glass bending lehr, the glass laden mold is conveyed on its mold support carriage through the lehr. The glass and mold are subjected to gradually increasing temperatures until the glass attains glass softening temperature.

Softening of the glass permits the counterweights 50 to rotate the sectionalized molding members 16 about the bearings formed between the ears 52 and the support bars 34. The extremity sections 20 are forced to rotate with the intermediate sections 18 because of the continued engagement of the underside of the straps 66 with the adjustable stop nuts 64. Fingers 70 rotate with strap 66 during the rotation of the sectionalized molding members 16.

Toward the end of the bending cycle, the fingers 70 come into sliding contact with the inner surface of the turned ends 40 and act as cooperating cam members of cam means. This sliding contact causes the extremities 20 to rotate into a closed mold position limited by the abutment of adjustable stop nuts 67 against the stop flanges 56 carried by each intermediate section 18. Rotation of the sectionalized molding members 16 relative to the center molding member 10 is limited by the abutment of the adjustable stop nuts 46 of the straps 44 carried by the intermediate sections 18 against the stop bar flanges 42 carried by the center rails 12 of the center molding member 10.

The action that takes place during the bending cycle causes the lifting of each intermediate region and its adjacent longitudinal extremity of the softened flat glass sheet about a first axis of rotation relatively distant from the extremities of the glass sheet and defined by the support bars 34, followed by additional lifting of the extreme tips of the longitudinal extremities of the glass about second axes of rotation relatively close to the extremities of the glass sheet and defined by the stub hinge rods 62. By inhibiting the latter rotation until the very end of the bending cycle, overbending of the glass tips is inhibited and the bent glass sheet is more easily located within an automotive frame, because it is more likely to be bent within the allowed tolerances. Furthermore, since overbending of the tips is prevented by virtue of the controlled bending provided by the present invention, there is less likelihood of breakage at the tips of the glass sheets to be bent and subsequently laminated, because there is less likelihood of mismatched areas due to uncontrolled bending of the tips.

The extremity sections 20 have their weight so distributed relative to the second pivot axes defined by stub hinge rods 62 that they normally tend to rotate to their outer positions when the mold is spread to receive flat glass. Such freedom to rotate in its outer position facilitates loading of the glass sheet.

When the adjustable stop nuts 46 and 67 contact the stop flanges 42 and 56, respectively, the mold provides a substantially continuous frame conforming in elevation and outline to the shape desired for the bent glass sheet. Immediately upon the attainment of such a curvature in the glass, the glass must be cooled rapidly to the annealing range, or chilled suddenly if the glass is desired to be tempered. Maintaining the glass at glass softening temperatures for too long a period causes undesired sagging of the glass.

The present application is a division of patent application Serial No. 557,361, filed January 4, 1956, which has matured into U.S. Patent No. 3,000,143 on September 19, 1961.

What is claimed is:

1. A sectionalized mold for bending a glass sheet comprising
   (a) a longitudinally disposed rigid central molding member having longitudinal ends and upper shaping surfaces;
   (b) a sectionalized molding member comprising
      (1) an intermediate section having longitudinally inner and longitudinally outer end portions and upper shaping surfaces, and
      (2) an extremity section having longitudinally inner and longitudinally outer end portions and upper shaping surfaces,
         said longitudinally inner end portion of said intermediate section being pivotally connected to a longitudinal end of said central molding member, and said longitudinally outer end portion of said intermediate section being pivotally connected to said longitudinally inner end portion of said extremity section, said sectionalized mold-molding member being longitudinally adjacent to said central molding member and movable into an extended position to receive flat glass and into a closed position wherein said upper shaping surfaces of the sectionalized molding member define a substantially continuous outline shaping surface conforming to the shape desired for the bent glass sheet;
   (c) first hinge means including first pivot means pivotally attaching the longitudinally inner end portion of said intermediate section to a longitudinal end of said central molding member;
   (d) second hinge means including second pivot means pivotally attaching the longitudinally outer end portion of said intermediate section to the longitudinally inner end portion of said extremity section, the center of gravity of said extremity section lying longitudinally outwardly of said second hinge means thereby securing said extremity section for rotation to an outward position relative to said intermediate section;

(e) weight means attached to said intermediate section and located on the longitudinally inner side of said first hinge means for urging the intermediate section into its closed position, said weight means having one end attached to said intermediate section and another end free to rotate in a substantially vertical plane from an upwardly disposed position in the open mold position to a downwardly disposed position in the closed mold position;

(f) a first cam member having one end secured to said central molding member and another end free to contact a cooperating second cam member, said free end of said first cam member extending from said secured end towards a longitudinal extremity of the mold;

(g) a second cam member having one end secured to said extremity section and another end in alignment with said free end of said first cam member and free to rotate into contact with said free end of said first cam member and extending from its secured end away from said longitudinal extremity of the mold; and wherein the secured ends of said first and second cam members are spaced apart longitudinally of said mold, said first and second cam members having lengths insufficient to contact each other in the extended position but sufficient to contact each other as the molding members move toward the closed position so that the first and second cam members cooperate for urging said extremity section to rotate into a closed mold position only after the intermediate section has moved substantially toward its closed position; and (h) stop means comprising separately mounted first and second stop elements each having an attached end and a free end, said attached end of said first stop element being attached to said intermediate section, said attached end of said second stop element being attached to said extremity section, and said free ends of said first and second stop elements free to rotate into abutting contact upon rotation of the intermediate and extremity sections to thereby inhibit movement of the extremity section beyond said outward position.

2. A sectionalized mold as in claim 1 wherein said first cam member comprises an outwardly extending finger rigidly attached at its secured end and having a turned end at its outer free end, and said second cam member comprises an inwardly extending finger.

3. A sectionalized mold as in claim 1 which includes ($b_2$) an additional sectionalized molding member pivotally secured to the other longitudinal end of said central molding member, said additional sectionalized molding member comprising (1) an additional intermediate section having longitudinally inner and longitudinally outer end portions and upper shaping surfaces, and (2) an additional extremity section having longitudinally inner and longitudinally outer end portions and upper shaping surfaces, said longitudinally inner end portion of said intermediate section being pivotally connected to the said other longitudinal end of said central molding member, and said longitudinally outer end portion of said intermediate section being pivotally connected to said longitudinally inner end portion of said extremity section, said additional sectionalized molding member being longitudinally adjacent to said central molding member at the said other longitudinal end thereof, and movable into an extended position to receive flat glass and into a closed position wherein said upper shaping surfaces of said additional sectionalized molding member define a substantially continuous outline shaping surface conforming to the shape desired for the bent glass sheet;

($c_2$) additional first hinge means including additional first pivot means pivotally attaching the longitudinally inner end portion of said additional intermediate section to said other longitudinal end of said central molding member;

($d_2$) additional second hinge means including additional second pivot means pivotally attaching the longitudinally outer end portion of said additional intermediate section to the longitudinally inner end portion of said additional extremity section, the center of gravity of said additional extremity section lying longitudinally outwardly of said additional second hinge means thereby securing said additional extremity section for rotation to an outward position relative to said additional intermediate section;

($e_2$) additional weight means attached to said additional intermediate section and located on the longitudinally inner side of said additional first hinge means for urging the additional intermediate section into its closed position, said additional weight means having one end attached to said additional intermediate section and another end free to rotate in a substantially vertical plane from an upwardly disposed position in the open mold position to a downwardly disposed position in the closed mold position;

($f_2$) an additional first cam member having one end secured to said central molding member and another end free to contact an additional cooperating second cam member, said free end of said additional first cam member extending from said secured end towards the other longitudinal extremity of the mold;

($g_2$) an additional second cam member having one end secured to said additional extremity section and another end in alignment with said free end of said additional first cam member and free to rotate into contact with said free end of said additional first cam member and extending from its secured end away from said other longitudinal extremity of the mold; and wherein the secured ends of said additional first and second cam members are spaced apart longitudinally of said mold, said additional first and second cam members having lengths insufficient to contact each other in the extended position but sufficient to contact each other as the molding members move toward the closed position so that said additional first and second cam members cooperate for urging said additional extremity section to rotate into a closed mold position only after said additional intermediate section has moved substantially toward its closed position; and ($h_2$) additional stop means comprising separately mounted additional first and second stop elements each having an attached end and a free end, said attached end of said additional first stop element being attached to said additional intermediate section, said attached end of said additional second stop element being attached to said additional extremity section, and said free ends of said additional first and second stop elements free to rotate into abutting contact upon rotation of the additional intermediate and additional extremity sections to thereby inhibit movement of the additional extremity section beyond said outward position.

4. A sectionalized mold as in claim 3 wherein said central molding member comprises a pair of spaced rails having upper surfaces of relatively gentle curvature, and wherein said intermediate and additional intermediate sections each comprise spaced rails having upper surfaces of relatively sharp curvature, and wherein said extremity and additional extremity sections each comprise a continuously curved rail.

References Cited in the file of this patent

UNITED STATES PATENTS

| | | |
|---|---|---|
| 1,920,528 | Butler et al. | Aug. 1, 1933 |
| 1,999,558 | Black | Apr. 30, 1935 |
| 2,317,904 | Galey | Apr. 27, 1943 |
| 2,486,153 | Gwyn | Oct. 25, 1949 |
| 2,554,572 | Jendrisak | May 29, 1951 |
| 2,608,799 | Babcock | Sept. 2, 1952 |
| 2,633,673 | Bamford | Apr. 7, 1953 |
| 2,682,730 | Rossen | July 6, 1954 |
| 2,737,758 | Jendrisak | Mar. 13, 1956 |
| 2,774,189 | Jendrisak | Dec. 18, 1956 |
| 2,861,396 | Richardson | Nov. 25, 1958 |

FOREIGN PATENTS

| | | |
|---|---|---|
| 1,089,973 | France | Oct. 13, 1954 |

UNITED STATES PATENT OFFICE
CERTIFICATE OF CORRECTION

Patent No. 3,092,482            June 4, 1963

Harold E. McKelvey

It is hereby certified that error appears in the above numbered patent requiring correction and that the said Letters Patent should read as corrected below.

Column 1, line 45, for "Planking" read -- Flanking --; column 2, line 11, after "bending" strike out the comma; column 4, lines 61 and 62, for "mold-molding" read -- molding member --.

Signed and sealed this 24th day of November 1964.

(SEAL)
Attest:

ERNEST W. SWIDER
Attesting Officer

EDWARD J. BRENNER
Commissioner of Patents